United States Statutory Invention Registration [19]

[11] Reg. Number: H737

Rushford [43] Published: Feb. 6, 1990

[54] LIGHT INTENSITY COMPRESSOR

[75] Inventor: Michael C. Rushford, Livermore, Calif.

[73] Assignee: The United States of America as represented by the United States Department of Energy, Washington, D.C.

[21] Appl. No.: 241,231

[22] Filed: Aug. 18, 1988

[51] Int. Cl.[4] ..... G02F 1/13

[52] U.S. Cl. ..... 350/347 E; 350/331 R; 350/337; 350/342

[58] Field of Search ..... 350/342, 347 E, 337, 350/331 R

[56] References Cited

U.S. PATENT DOCUMENTS

| | | | |
|---|---|---|---|
| 3,944,817 | 3/1976 | Hilsum et al. | 350/342 X |
| 4,073,571 | 2/1978 | Grinberg et al. | 350/337 X |
| 4,191,456 | 3/1980 | Honz et al. | 350/342 |
| 4,749,257 | 6/1988 | Klausz | 350/331 R |

OTHER PUBLICATIONS

Haas et al., "Ultralow-Voltage Image Intensifiers", Applied Physics Letters, vol. 29, No. 10, Nov. 15, 1976.

Colburn et al., "Photoconductor-Thermoplastic Image Transducer", Optical Engineering, vol. 17, No. 4, Jul.-Aug. 1978.

Margerum et al., "Reversible Ultraviolet Imaging with Liquid Crystals", Applied Physics Letters, vol. 17, No. 2, Jul. 15, 1970.

Bleha et al., "Application of Liquid Crystal Light Value to Real Time Optical Data Processing", vol. 17, No. 4, Optical Engineering, Jul.-Aug. 1978.

*Primary Examiner*—Thomas H. Tarcza
*Assistant Examiner*—Linda J. Wallace
*Attorney, Agent, or Firm*—L. E. Carnahan; Roger S. Gaither; Judson R. Hightower

[57] ABSTRACT

In a system for recording images having vastly differing light intensities over the face of the image, a light intensity compressor is provided that utilizes the properties of twisted nematic liquid crystals to compress the image intensity. A photoconductor or photodiode material that is responsive to the wavelength of radiation being recorded is placed adjacent a layer of twisted nematic liquid crystal material. An electric potential applied to a pair of electrodes that are disposed outside of the liquid crystal/photoconductor arrangement to provide an electric field in the vicinity of the liquid crystal material. The electrodes are substantially transparent to the form of radiation being recorded. A pair of crossed polarizers are provided on opposite sides of the liquid crystal. The front polarizer linearly polarizes the light, while the back polarizer cooperates with the front polarizer and the liquid crystal material to compress the intensity of a viewed scene. Light incident upon the intensity compressor activates the photoconductor in proportion to the intensity of the light, thereby varying the field applied to the liquid crystal. The increased field causes the liquid crystal to have less of a twisting effect on the incident linearly polarized light, which will cause an increased percentage of the light to be absorbed by the back polarizer. The intensity of an image may be compressed by forming an image on the light intensity compressor.

15 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LIGHT INTENSITY COMPRESSOR

The U.S. Government has rights in this invention pursuant to Contract No. W-7405-ENG-48 between the U.S. Department of Energy and the University of California for the operation of the Lawrence Livermore National Laboratory.

BACKGROUND OF THE INVENTION

The present invention relates generally to a technique for compressing relatively large light intensity ranges. More particularly, the invention discloses a twisted nematic liquid crystal cell with a photoconductor or photodiode applied field for use as a light intensity compressor for use with standard video or photographic equipment.

The human eye is capable of viewing objects under vastly differing illumination intensities. In contrast, when we attempt to record an image using photography and/or video camera recorders, we quickly find that most such devices can capture only a small part of the visual experience that we enjoy with our eyes. The problem of displaying scenes having large variations in interscene illumination intensity is twofold. First, commercially available cameras only accommodate interscene intensity variations of 100–500 times or 2–3 orders of magnitude. Secondly, the monitors available for such cameras accommodate interscene intensity changes over a range of approximately 50–100 times (1 or 2 orders of magnitude). The limited dynamic range of conventional video recording equipment has sponsored the need for a device capable of compressing the interscene intensity of images having a wide dynamic range to within the limited dynamic range presently available in conventional video recording equipment.

For example, the Applicant has found a need to view a crucible containing molten uranium in an atomic vapor laser isotope separation (AVLIS) system. However, this molten uranium containing crucible functions as a black body having a center which is at a temperature of approximately 4,000° K. and having an outer temperature on the order of 1,200° K. Thus, the temperature range across this black body is approximately 3,000° K. and has a correspondingly large interscene light intensity range of approximately 7 orders of magnitude at 480 nm. Such a large interscene intensity range is far too large for a standard video camera or similar instruments to receive and decipher. Therefore, if standard viewing and/or recording equipment is to be used to view the crucible, its light intensity range must be compressed to a tolerable level.

Complete control over the interscene intensity range is possible using two dimensional light valves (TDLV). The simplest form of TDLV is photo grey glass, which can compress the interscene intensity dynamic range by at least a factor of 10. Alternatively, prior art techniques have attempted to accomplish the same purpose electronically. That is, by converting the incoming light to corresponding electrical signals, compressing the electrical signals, and then converting those compressed electrical signals back to light. The resultant light is thus compressed relative to the incoming light. However, Applicant has found that such "electronic" approaches to light compression are relatively complicated and expensive.

An article written by Younse, et al. entitled "Wide Dynamic Range CCD Camera," SPIE Volume 501: State-of-the-Art Imaging Arrays and their applications (1984), discusses the use of a liquid crystal attenuator operated as a variable neutral density filter for extending the dynamic range of a solid state television camera by an order of magnitude. As described therein, a twisted nematic liquid crystal is sandwiched between a pair of crossed polarizers. An electrode pattern formed of $In_2O_3$ disposed between the top polarizer and the liquid crystal is adapted to apply an electric field in the vicinity of the liquid crystal cell. An ambient photo sensor controls the intensity of the field applied as a direct function of the ambient light level. While such a device is capable of extending the dynamic range of a CCD imager by a factor of twelve, it provides substantially equal compression over the entire image and thus is inappropriate for recording scenes having large interscene light intensity variations. Rather it functions substantially as an electrical equivalent of an auto-iris lens.

An article by Marqerum, et al., in Applied Physics Letters, Volume 17(2) (1970) entitled "Reversible ultraviolet imaging with liquid crystals," describes a method for recording light-scattering images in nearly real-time using nematic liquid crystals. The device described therein includes a nematic liquid crystal that is covered with a photoconductive coating of ZnS which is sensitive to ultraviolet light. The liquid crystal and photoconductive layers are sandwiched between a pair of transparent electrodes which are used to apply a voltage to the device. The actual intensity of the field in the region of the liquid crystal will depend upon the extent to which the photoconductive layer has been activated. Ultraviolet exposure of the photoconductive ZnS layer is used to regulate the field applied in the liquid crystal region. However, the device described therein in not suitable for use as a light intensity compressor since it is designed to store photo images within the liquid crystal layer.

Co-pending application Ser. Nos. 863 912, now U.S. Pat. No. 4,815,828, filed May 16, 1986 and 863,758, now U.S. Pat. No. 4,726,660, filed May 16, 1986 disclose a wide variety of pin hole camera assemblies that incorporate devices for compressing light intensity ranges utilizing a variety of optical compression techniques including photogray glass, interference filters and thermally responsive liquid crystal notch filters. The present invention relates to these two application and presents an alternative method of optically compressing light intensity using a photoactivated twisted nematic liquid crystal arrangement.

SUMMARY OF THE INVENTION

In view of the foregoing, it is an object of the present invention to provide an entirely optical technique for compressing a light intensity range.

Another object of the present invention is to optically compress light intensity ranges using a twisted nematic liquid crystal cell with a photoconductor or a photodiode applied field.

Another object of the present invention is to provide a camera assembly including standard camera recording equipment for viewing and recording a scene having a light intensity range which is normally outside the intensity range capabilities of the standard recording equipment used by the camera.

To achieve the foregoing and other objects and in accordance with the purpose of the present invention, a light intensity compressor is provided for use in conjunction with an image recording device, as a pinhole camera, that views a scene. The light intensity compressor includes a twisted nematic liquid crystal layer that is disposed between a pair of crossed polarizers. A field generating means is provided for applying an electric field to a region of the liquid crystal material that corresponds in intensity to the light intensity profile of the scene. The polarizers are aligned such that they will cooperate with the liquid crystal material to compress the light intensity profile of the viewed scene.

Preferably the field generating means include a pair of electrodes disposed on either side of the twisted nematic liquid crystal layer and means for applying a time varying potential between the front and back electrodes. A photosensitive material is placed between the liquid crystal layer and one of the electrodes. The photosensitive material is sensitive to the radiation being viewed and therefor causes the electric field in the vicinity of the liquid crystal material to vary in accordance with the intensity of the incident light.

Preferably, the light intensity compressor is incorporated into an optical system that forms an image of the object being viewed thereon. In a preferred system for viewing molten metals, the photosensitive material is responsive to radiation having a wavelength shorter than 700 nm, while being substantially transparent to radiation having a wavelength longer than 800 nm.

BRIEF DESCRIPTION OF THE DRAWINGS

The features of the present invention which are believed to be novel are set forth with particularly in the appended claims. The invention, together with further objects and advantages thereof, may best be understood by reference to the following description of the presently preferred embodiment, taken in conjunction with the accompanying drawings in which:

DETAILED DESCRIPTION OF THE DRAWINGS

Figures 1, 2:
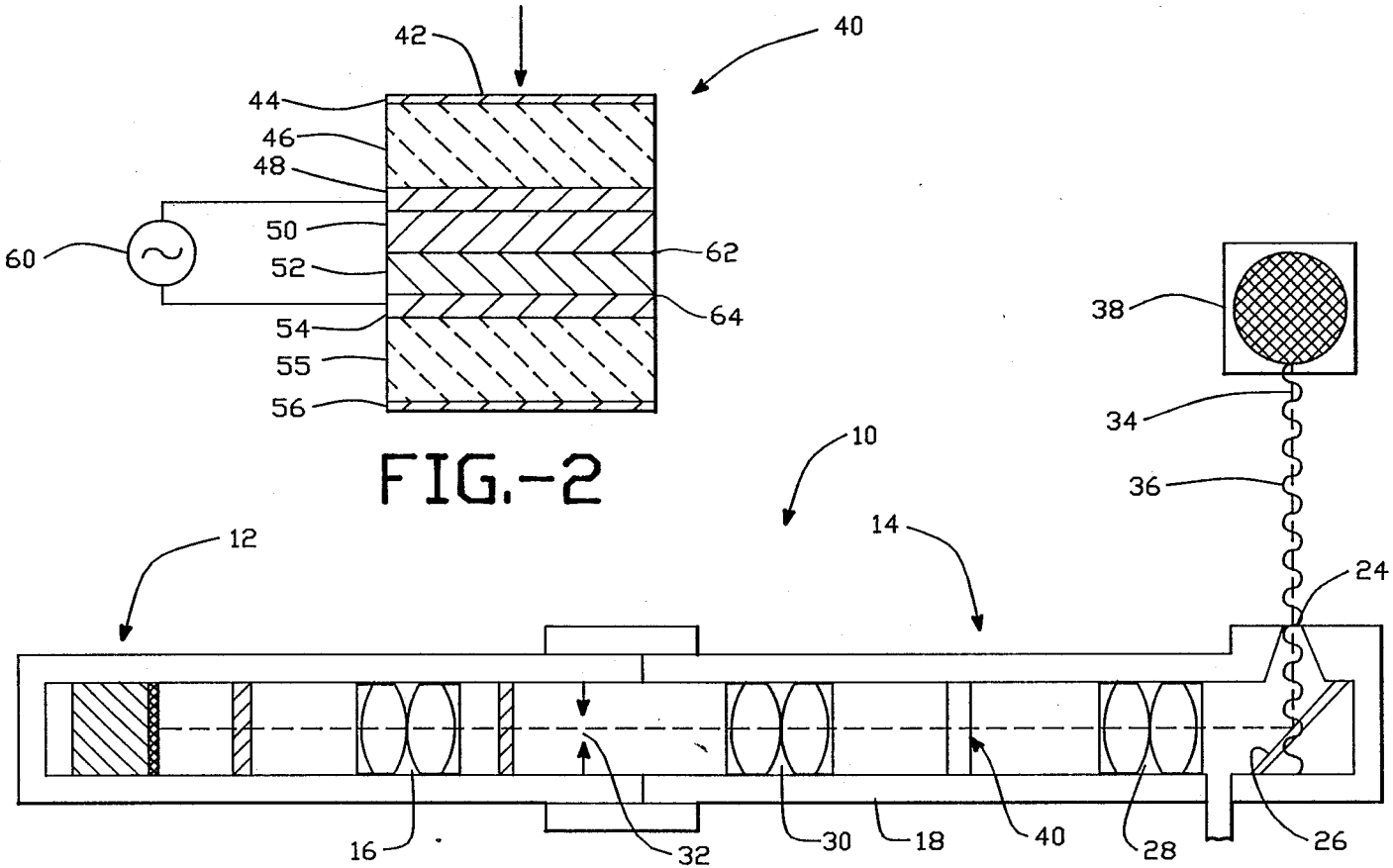
FIG. 1 is a diagrammatic illustration of a pin-hole camera including an assembly designed in accordance with the present invention for compressing the light intensity range from an object being viewed by the camera.
FIG. 2 diagrammatically illustrates a twisted nematic liquid crystal arrangement with photoconductors that form a light compressor in accordance with the present invention.

Reference will now be made to a preferred embodiment of the invention, examples of which are illustrated in the accompanying drawings. While the invention will be described in detail in connection with this preferred embodiment, it will be understood that it is not intended to limit the invention to that embodiment. On the contrary, it is intended to cover all alternative modifications and equivalents as may be included within the spirit and scope of the invention as defined by the appended claims.

Referring first to FIG. 1 which illustrates a pinhole camera assembly 10 which includes two sections, a camera section 12 and a separate and distinct pinhole imaging assembly (optical section) 14. The camera section 12, which is only partially shown, may be of any suitable known kind, including an ordinary CCD TV camera 13. In either case, the camera section 12 includes a lens assembly or eye piece 16 which may have a fixed focus or one which is variable. A narrow band interference filter 17 may be disposed between CCD TV camera 13 and the eye piece 16. Optic section 14 includes a subsection 18 fixedly mounted in space-apart coaxial relationship with the input to camera section 12 by suitable means (not shown) and a subsection 22 which extends perpendicular to subsection 18 and which defines a pinhole aperture 24. The optic section 14 may include any suitable objects for reproducing the aperture onto an entrance pupil image plane 32 of the camera section 12. In the embodiment illustrated, this is accomplished through the use of an inclined mirror or other suitable light reflecting surface 26 that is fixedly disposed at the juncture between subsection 18 and 22 for directing light entering aperture 24 through subsection 18 in the direction of camera 12. Spaced-apart eye pieces 28 and 30 located within subsection 18 act on this light to reproduce an image of the aperture onto pinhole image plane 32. Also eye piece 28 forms an image of the source 38 on an intensity compressor 40 to be discussed hereinafter.

Camera assembly 10 is designed especially for viewing scenes having relatively large variations of intensity. Specifically the image intensity range viewed is typically outside the capabilities of standard camera equipment (2–3 orders of interscene image intensity variation). One such object is molten uranium in a crucible where the temperature range across the crucible is as high as 3000 degrees Kelvin, thereby resulting in a correspondingly large light intensity range that varies over 6–9 orders of magnitude. To this end, camera assembly 10 includes an arrangement for optically compressing the light intensity range being viewed, by 1 to 3 orders of magnitude, before it reaches camera section 12. The arrangement, which is generally shown as intensity compressor 40 is shown forming part of the overall optics section 14.

In so much as overall camera assembly 10 illustrated in FIG. 1 is especially suitable for viewing molten metals which often are sources of X-ray radiation, as for example, molten uranium in a crucible forming part of an AVLIS system, the light reflecting surface 26 is preferably designed to transmit or absorb the X-ray radiation. In Figure 1, the visible light entering aperture 24 of optic section 14 is diagrammatically illustrated by dotted lines at 34 while X-ray radiation entering the aperture 24 of optics section 14 is diagrammatically illustrated by wavy line 36. Both forms of radiation are shown emanating from an object 38 being viewed by the camera assembly 10.

Intensity compressor 40 is designed in accordance with the present invention to include a twisted nematic liquid crystal cell with a photoconductor or photodiode applied field. Turning now to FIG. 2, attention is directed to the construction of intensity compressor 40 and the manner in which it functions to compress the light intensity range of light appearing on its front face 42. The overall intensity compressor 40 includes a front polarizer 44, a front glass substrate 46, a front transparent electrode 48, a photoconductive layer 50, a layer of twisted nematic liquid crystal 52 having crossed alignment layers 62, 64 on its front and back surfaces, a back transparent electrode 54 a back glass substrate 55, a back polarizer 56 and an AC power source 60. Alignment layers 62 and 64 are placed just inside electrodes 48 and 54 respectively.

Functionally, light enters intensity compressor 40 through front polarizer 44 which attempts to pass only light of a particular orientation. The polarized light passes through twisted nematic liquid crystal 52 which rotates the orientation of the light by approximately 90 degrees in its normal state. The reoriented light is then passed through a back polarizer 56. The back polarizer 56 is crossed relative to (oriented 90 degrees away from) the front polarizer 44 such that it is aligned to pass the reoriented light that is twisted by the nematic liquid crystal 52.

Twisted nematic liquid crystals generally are known to the art. Functionally, they have a plurality of aligned molecules that will twist the orientation of polarized light approximately 90 degrees provided that the initial polarization is parallel to the optic axis of the liquid crystal at the surface. The alignment can be altered by applying an electric field to the vicinity of the liquid crystal. Application of an electric field tends to straighten out the twisted nematic structure. In a region between a threshold level and a saturation point, the larger the electric field, the less the twist imparted by the liquid crystal material. If the light is not fully twisted, a greater percentage will be absorbed by the back polarizer. This characteristic of twisted nematic liquid crystal cells is used advantageously in the present invention to provide a light intensity compressor.

Electrodes 48 and 54, and photoconductive layer 50 are utilized in conjunction with an AC power source 60 to provide an electric field in the vicinity of the liquid crystal that varies in accordance with intensity of the light incident upon the front surface 42 of intensity compressor 40. Electrodes 48 and 54 are formed of an electrode material that is transparent to light. By way of example, a suitable transparent electrode material is indium tin oxide (ITO). The potential applied by AC power source 60 is chosen such that when no light is incident upon the intensity compressor, the field across liquid crystal material 52 is below the threshold which effects the alignment of the twisted nematic molecules. The photoconductive material 50 is preferably sandwiched between the front electrode 48 and the liquid crystal 52. The photoconductive material 50 must be sensitive to the wavelengths of electromagnetic radiation being viewed. With such an arrangement, the higher the intensity of the light being viewed, the more conductive the photoconductive layer 50 will become. The increased conductivity of photoconductive layer 50 allows the AC potential generated by AC power source 60 to penetrate closer to the liquid crystal 52, thereby increasing the intensity of the field in the vicinity of liquid crystal 52. The stronger the applied field, the lower the percentage of light that passes through the intensity compressor and hence, the more the light intensity is compressed.

For purposes of clarity, the discussion above has been treated as if the entire intensity compressor 40 acts as one large unit. However, in a system such as the pinhole camera arrangement shown in FIG. 1, an image of varying intensity is shown on the intensity compressor. The arrangement described will function as a light intensity compressor since the regions having the largest amount of incident light will make the portion of the photoconductor most conductive in that region, thereby increasing the field across the liquid crystal the most in that region, which in turn causes more light to be absorbed by the back polarizer 56 in that region.

In a system for viewing molten metals and the like, which have temperatures ranging up to 4000 degrees K, it is desirable to have a photoconductor that is responsive to visible light, and particularly light having a wavelength of less than 700 nanometers (nm), while being transparent to radiation having a wavelength longer than 800 nm. Although there are numerous appropriate photoconductor materials, one that is particularly appropriate is PVK-TNF available from Polyscience. A light intensity compressor for viewing molten metals as described herein will have to be able to compress light intensity from a range covering approximately 7 orders of magnitude down to a range covering approximately 50 to 500 times, depending upon whether photographic equipment or video monitors are being used. Therefore, it is important to have polarizers having an extinction ratio of at least 800 to 1 and preferably, an extinction ration of 1000 to 1 or greater. By way of example, an appropriate polaroid material is HN-22 available from Polaroid Corp. (Extinction ratio refers to the ratio of how much light is passed on an oriented axis, verses the amount of light that will pass that has an orientation perpendicular to the oriented axis.)

Although only one embodiment of the present invention has been described in detail, it should be understood that the present invention may be embodied in many other specific forms without departing from the spirit or scope of the invention. Particularly, it should be understood that the light intensity compressor of the present invention may be used with a wide variety of recording equipment and the pinhole camera arrangement disclosed may be widely varied while still accomplishing the goals of forming an image on the light intensity compressor and the camera assembly. Additionally, it will be appreciated that the actual material used to form the light intensity compressor may be varied, so long as the substituted materials accomplish the same effect. Further, in some circumstances it may be desirable to incorporate two or more light compressors into a system to enhance the dynamic range of the recording equipment. Alternatively, it might be desirable in some circumstances to provide multiple back polarizers to increase the effective extinction ratio of that part. Therefore, the present examples and embodiments are to be considered as illustrative and not restrictive, and the invention is not to be limited to the details given herein, but may be modified within the scope of the appended claims.

What is claimed:

1. In a system in which a scene having a given light intensity profile is viewed, an assembly for compressing the light intensity range associated with that profile, comprising:

a light intensity compressor including, a twisted nematic liquid crystal material, means for applying an electric field having an intensity profile corresponding to the light intensity profile of said scene to a region of the liquid crystal material, and a first and second polarizer, said polarizers being disposed on opposite sides of the liquid crystal material, the first and second polarizers and said liquid crystal material cooperating to compress the light intensity profile of the viewed scene;

means for forming an image of the scene being viewed on the light intensity compressor; and means for viewing a compressed image of the scene.

2. A system as recited in claim 1 wherein said viewing means records the compressed image of the scene and the electric field means includes a photosensitive material that is responsive to at least a portion of the type of radiation used to form the image recorded.

3. A system as recited in claim 2 wherein said photosensitive material is responsive to electromagnetic radiation having a wavelength less than 700nm.

4. A system as recited in claim 2 wherein said photosensitive material is disposed adjacent the liquid crystal material, the light intensity compressor further comprising a pair of electrode disposed on opposite sides of said liquid crystal material, a first one of said electrodes being formed of a material substantially transparent to the type of radiation used to form the image recorded.

5. A system as recited in claim 1 further comprising means for forming an image of the scene being viewed at the viewing means.

6. A system as recited in claim 5 wherein said viewing means includes a video camera.

7. A system as recited in claim 5 wherein said viewing means includes a photographic camera.

8. A system as recited in claim 3 wherein the scene being viewed is a molten metal.

9. A system as recited in claim 2 wherein said means for forming an image includes a pinhole imaging assembly.

10. A light intensity compressor comprising:

a twisted nematic liquid crystal material;

a front electrode positioned on a first side of the liquid crystal material;

a back electrode positioned on a second side of the liquid crystal material;

means for applying a time varying potential between the front and back electrodes;

a photosensitive material that is sensitive to visible light, the photosensitive material serving to vary the electric field in the vicinity of the liquid crystal material in response to the intensity of the light directed upon the compressor;

a first polarizer disposed on a first side of the liquid crystal material; and a second polarizer disposed on a second side of the liquid crystal material, the first and second polarizers and said liquid crystal material cooperating to compress the light intensity profile of a viewed scene.

11. A light intensity compressor as recited in claim 10 wherein said photosensitive material is responsive to radiation having a wavelength shorter than 700 nanometers.

12. A light intensity compressor as recited in claim 11 wherein said photosensitive material is substantially transparent to radiation longer than than 800 nanometers.

13. A light intensity compressor as recited in claim 12 wherein said first and second polarizers have extinction ratios of at least 1000 to 1.

14. A light intensity compressor as recited in claim 12 wherein said photosensitive material is a photoconductor.

15. A light intensity compressor as recited in claim 12 wherein said photosensitive material is a photodiode.

* * * * *